BROWN & GERTH.
Wheel Plow.
No. 78,785.
Patented June 9, 1868.
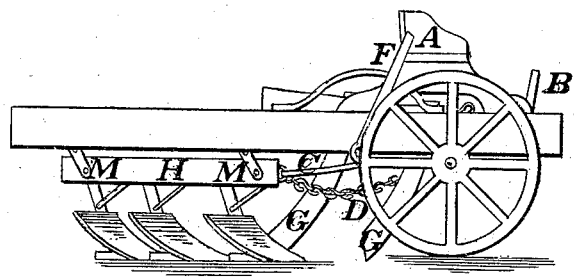
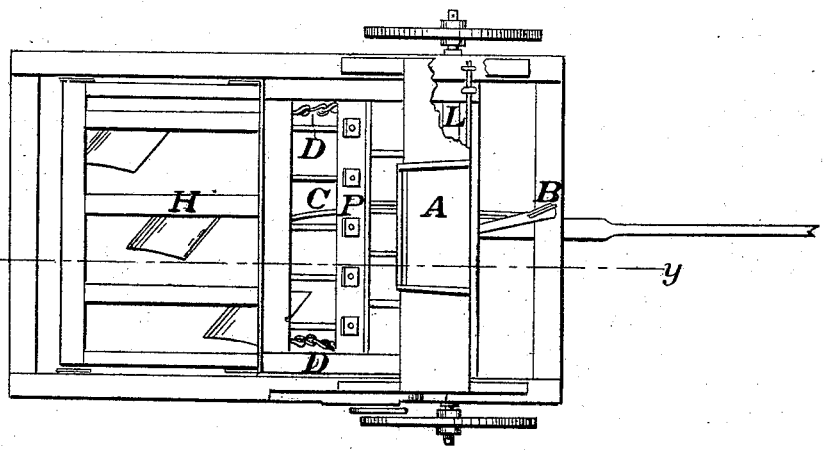
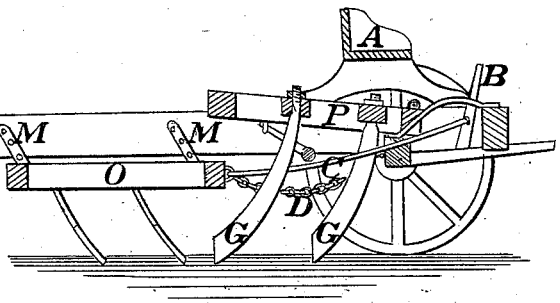

United States Patent Office.

CHARLES BROWN AND LEONIDAS A. GERTH, OF PEORIA, ILLINOIS.

Letters Patent No. 78,785, dated June 9, 1868.

IMPROVEMENT IN PLOWS.

*The Schedule referred to in these Letters Patent and making part of the same.*

TO ALL WHOM IT MAY CONCERN:

Be it known that we, CHARLES A. BROWN and LEONIDAS GERTH, of Peoria, in the county of Peoria, and State of Illinois, have invented a new and valuable Improvement in Plows; and we do hereby declare that the following is a full, clear, and exact description of the same, reference being had to the annexed drawings, making a part of this specification, and to the letters and figures of reference marked thereon.

The nature of our invention consists in combining, in one machine, devices for effectually breaking up and pulverizing prairie or other heavily-swarded grounds, or grounds that are encumbered with hard, clayey lumps, with devices for cultivating growing crops.

Figure 1 of the drawings represents a side view of our machine, with the breaking-up plows attached.

Figure 2 is a plan view of the same, with the plows attached, and with a portion of the bench-board broken off to show the construction of some mechanism thereunder.

Figure 3 is a sectional view of the machine with the cultivator attached.

Letter A of the drawings represents the driver's seat.

Letter B is a lever, by which the plows or cultivator are raised or lowered.

Letter C is a rod, extending from lever B to the frame of the plows or cultivator, and connects said lever with said frames respectively.

Letter D represents chains, that connect the plough or cultivator-frame with the axle of the carriage.

Letter F is a lever, connected with a roller, having lifting-arms, to be used in raising or lowering the frame on which the knives are placed.

The levers B and F are held in the desired position by means of suitable ratchets adapted to that purpose.

Letter G is a series of knives, firmly adjusted in two cross-bars of the frame P, which said frame is arranged immediately under the driver's seat. The forward end of this frame P is secured by the rod L, and the staples therewith shown. We usually place eleven or twelve of these knives on these cross-beams, and adjust them in such manner that the knives in the rear beam shall respectively occupy a space midway between the knives on the forward beam.

Letter H is a frame, constructed in the form shown on fig. 2, with three longitudinal beams, to each of which we attach a breaking-up plow in the manner shown. This frame is connected with the main frame of the carriage by swinging bars, represented by the letters M. These bars are usually usually four in number, one of which is placed near each corner of the frame H. These swinging bars have holes, fitted to receive pins on the outside of the plow-frame, by means of which the plow-frame is raised or lowered, at the will of the operator.

Our cultivator is constructed with shovel-plows, and is arranged on a frame similar to the plow-frame, but we prefer to adjust the shovel-plows on cross-bars, set at right angles with the axle of the carriage. The cultivator-frame is marked O on fig. 3, and its methods of adjustment and operation are in all respects the same as those of the plow-frame above described.

The main frame of the machine is about seven and a half feet in length, and about three feet in width, on the inside thereof.

Our device is operated as follows, namely:

By means of the levers B and F, we adjust the position of the knives and plows to the desired altitude, and set the machine in motion by any suitable motive-power. The series of knives is forced through the sod, cutting it into small strips, and also cutting and loosening the ground underneath the sod to the desired depth. The plows follow and thoroughly turn over the surface of the ground, thus altogether pulverizing it into light and well-manipulated furrows. We usually design to turn up the soil about three feet in width wherever the machine passes.

Whenever we desire to use the machine as a cultivator, we remove the plow-frame, and substitute the cultivator-frame in its stead. The knives may be used with the cultivator, when it is desirable so to do, or their use may be dispensed with, by removing or raising them from the ground by the use of lever F.

What we claim as our invention, and desire to secure by Letters Patent, is—

A combined plowing and cultivating-machine, having levers B and F, with ratchets thereto, rod C, chains D, knives G, frames H, P, and O, and swinging bars M, constructed, arranged, and operating substantially as specified.

CHARLES BROWN,
LEONIDAS A. GERTH.

Witnesses:
   GEO. PUTERBAUGH,
   EUGENE McCUNE.